March 17, 1970  R. B. PICKARD  3,501,172

CLOSET ASSEMBLY

Filed Nov. 12, 1968

INVENTOR.
Robert B. Pickard
BY
Bernard, McGlynn & Reising
ATTORNEYS

United States Patent Office 3,501,172
Patented Mar. 17, 1970

3,501,172
CLOSET ASSEMBLY
Robert B. Pickard, 30227 Oakview,
Livonia, Mich. 48154
Filed Nov. 12, 1968, Ser. No. 774,706
Int. Cl. F16l 55/00
U.S. Cl. 285—59                        8 Claims

ABSTRACT OF THE DISCLOSURE

A closet assembly including a water closet having an exhaust flange, a soil pipe and a closet ring interconnecting the soil pipe and the exhaust flange of the water closet. The closet ring has a radial flange for resting upon a surface surrouding the soil pipe. The closet ring includes a first annular portion extending from the radial flange and a second annular portion extending from the first annular portion with a smaller diameter than the first annular portion and connected thereto by a radially extending section. An annular seal is disposed about the second annular portion of the ring and includes a pair of ribs for sealing engagement with the interior of the soil pipe and a radially extending lip for disposition on the end of the soil pipe and in sealing engagement with the radially extending section of the closet ring.

---

Figure 1:
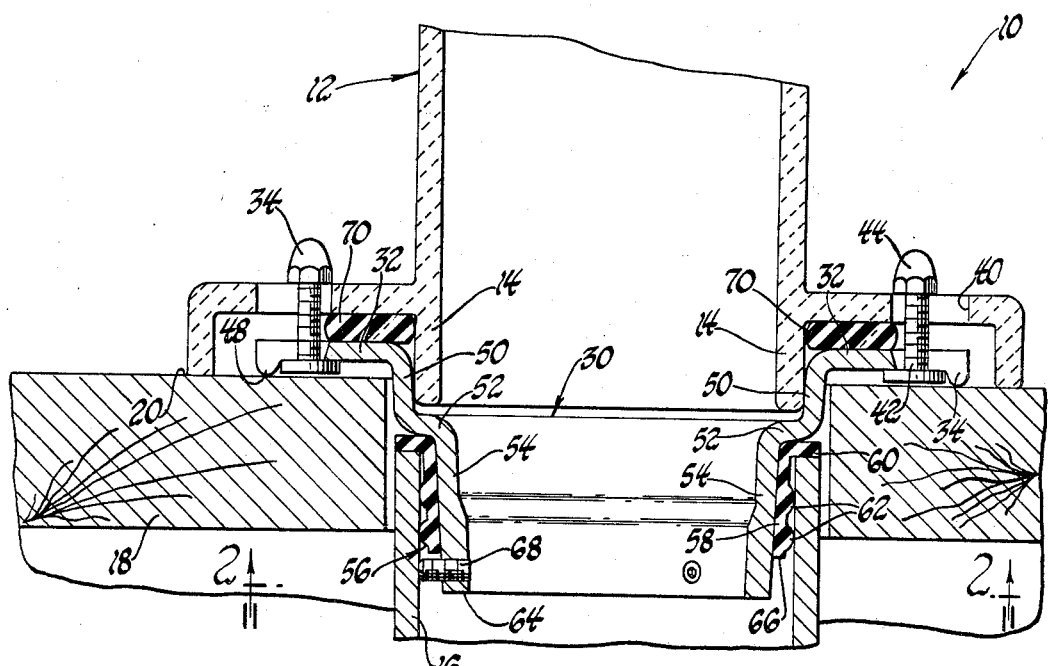

The instant invention relates to an improved closet ring for interconnecting a water closet and the upper end of a soil pipe.

Frequently, a concrete floor is poured about an upstanding soil pipe whereby the concrete floor is contiguous with the outer diameter of the soil pipe. In order to attach a water closet to such a soil pipe, it has frequently been the practice to chip the concrete away around the soil pipe and thereafter utilize poured hot lead to effect a sealed connection.

A significant improvement was made by the introduction of a closet ring for mechanically interconnecting the water closet and a soil pipe. Such a closet ring is shown in U.S. Patent No. 3,101,960 wherein there is disclosed a soil pipe having an upper end flush with the surface of the surrounding cement floor and a closet ring having a radially extending flange with an annular portion extending therefrom and in engagement with the interior of the soil pipe. There is an annular recess or groove in the flange and a sealing material fills this groove so as to form a seal between the flange and the surrounding cement floor. Such a closet ring has proven very satisfactory in enviromnents where the cement floor is contiguous with the outer diameter of the soil pipe.

There are numerous situations, however, where the soil pipe does not extend upwardly through a poured concrete floor but intsead is surrounded by a wood, ceramic or tile floor which is spaced from the soil pipe and not contiguous with the outer diameter of the soil pipe as is a poured concrete floor. In utilizing the above-described closet ring the sealing is acomplished by disposing a sealing material between the radially extending flange and the top of the soil pipe and the contiguous cement floor surrounding the soil pipe. The disposition of such a sealing material will not provide a satisfactory seal in the situation where the floor is spaced from the top of the soil pipe.

Additionally, the closet ring of the type disclosed in the aforementioned patent is not universal in that it cannot be utilized with all water closets and all soil pipes. Water closets have exhaust flanges commonly referred to as horns. These exhaust flanges extend downwardly various distances. Some extend downwardly farther than the lowest extremity of the water closet, such being referred to as long horns. Some are flush with or coplanar with the lowest extremity of the water closet while others do not extend downwardly as far as the lowest extremity of the water closet. In addition to these variances among different water closets, the diameter of such exhaust flanges varies from water closet to water closet. To further complicate the situation, various different standard diameters of soil pipes are utilized.

Accordingly, it is an object and feature of this invention to provide a closet ring for interconnecting a water closet and a soil pipe which may be universally utilized with water closets having different sizes of exhaust flanges and with soil pipes of various different standard diameters and which provides an effective seal regardless of the type of floor surrounding the soil pipe.

Another object and feature of this invention is to provide an assembly for interconnectting a water closet and a soil pipe including a closet ring having a radial flange with means for attaching a water closet thereto and a first annular portion extending from the radial flange for receiving the exhaust flange and a second annular portion having a smaller diameter than the first annular portion and connected thereto by a radially extending section for insertion into the soil pipe with a seal for sealing disposition between the second portion of the closet ring and the soil pipe.

Figure 2:
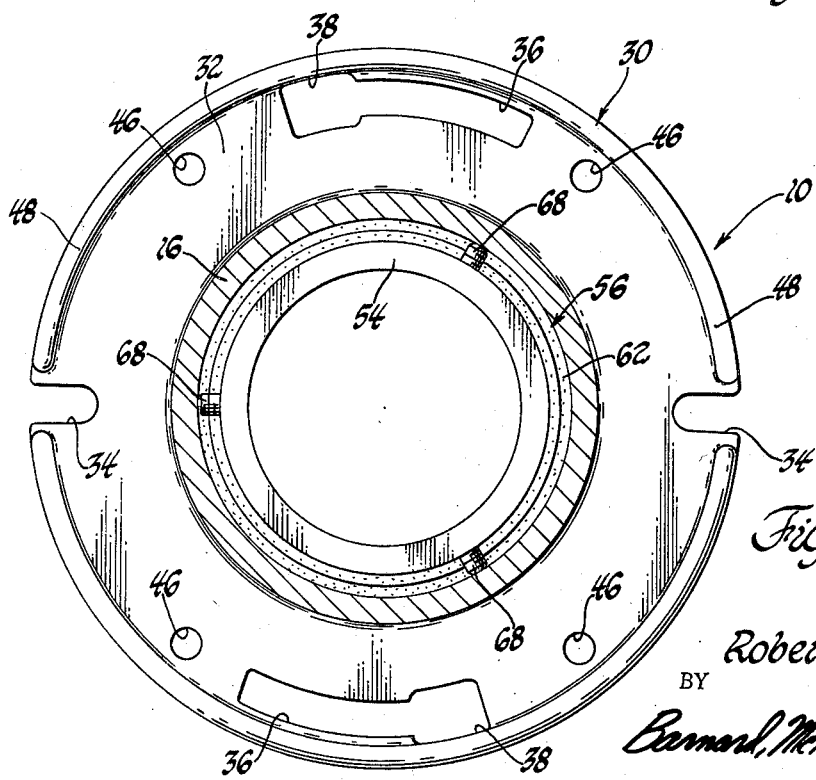

Other objects and attendant advantages of the present invention will be readily appreciated as the same becomes better understood by reference to the following detailed description when considered in connection with the accompanying drawings wherein:

FIGURE 1 is a fragmentary cross sectional view taken through the center of a water closet assembly utilizing the closet ring of the instant invention; and FIGURE 2 is a cross sectional view taken substantially along line 2—2 of FIGURE 1.

Referring now to the drawings wherein like numerals indicate like or corresponding parts throughout the several views, a water closet assembly is generally shown at 10.

The assembly includes a water closet generally indicated at 12 and having an annular exhaust flange 14. There is also included a soil pipe 16 which is surrounded by a wood floor 18 having an upper surface 20. The surface 20 surrounds the soil pipe 16 and is spaced therefrom.

The closet ring of instant invention is generally indicated at 30. The closet ring 30 includes a radial flange 32 which rests upon the surface 20 about the soil pipe 16. The flange 32 includes means for attaching the water closet 12 to the flange 32 and, in addition, means for securing the closet ring to the surface 20 or the floor 18 about the soil pipe 16. More specifically, the means for attaching the water closet to the closet ring include alternative means comprising a pair of diametrically opposed slots 34, each of which extends radially into the flange 32, and circumferentially extending slots 36 having enlarged portions 38. Either of these may be utilized for securing the water closet to the ring 30. As illustrated in FIGURE 1, the water closet has a slot 40 through which extends a bolt 42. The bolt 42 has a head at its lower end and a nut 44 threadedly secured thereto at the opposite end. In installing the water closet, the nut 44 is loosened and the head of the bolt is moved into the slot 34 whereupon the nut 44 is tightened. Alternatively, the attachment of the water closet to the ring may be accomplished by disposing the heads of the bolts 42 through the enlarged portions 38 of the slots 36 which the water closet disposed in position with the studs extending through the slots 40 therein. The water closet is thereafter rotated to move the bolts 42 along the slots 36 until the water closet is in the proper position whereupon the nuts 44 are tightened.

Additionally, there is included a plurality of holes 46 through which screws and the like may be disposed for attaching the flange 32 to the wooden floor 18. The flange 32 also includes an annular bead 48 extending circumferentially thereabout for engaging the upper surface 20 of the floor 18.

The closet ring 30 includes a first annular portion 50 extending axially from the radial flange 32 and receiving the exhaust flange 14. A radially extending section 52 is connected to the first annular portion 50 at the lower end thereof. The closet ring 30 also includes a second annular portion 54 at the lower end thereof. The second annular portion 54 is connected to the radially extending section 52 and extends into the soil pipe 16. The first annular portion 50 has a larger diameter than the second annular portion 54 whereby the larger first portion 50 may receive water closets having various different sizes of exhaust flanges and whereby the second annular portion 54 may be disposed into soil pipes of various different diameters. In addition, the second annular portion 54 is spaced from the soil pipe 16 and a seal means 56 is disposed about the second portion 54 and in sealing engagement with the interior of the soil pipe 16. The seal means includes an annulus 58 or tubular portion disposed between the second portion 54 and the soil pipe 16 and a radial lip 60 is disposed between the radially extending section 52 and the upper end of the soil pipe 16. A pair of ribs 62 extend annularly about the annulus 58 of the seal 56 for sealing engagement with the interior of the soil pipe 16. The tubular portion 58 is conical so as to decrease in diameter in direction away from the lip 60.

The second portion 54 of the closet ring is conical so as to have a decreasing diameter therealong in a direction away from the radially extending section 52 and toward the lower end or extremity 64 thereof. The second portion 54 of the closet ring is longer than the annulus 58 of the seal means whereby the respective ends, 66 of the seal means and 64 of the second portion 54, are spaced along the soil pipe 16. Screw means comprising a plurality of threaded screws 68 extend through and threadedly engage the second portion 54 of the ring and extend therefrom to engage the interior of the soil pipe 16 for retaining the closet ring in the soil pipe. The screws 68 are disposed between the ends 66 and 64 of the annulus 58 of the seal means and the second portion 54 of the closet ring. The screws 68 are Allen-type screws which may be tightened against the interior of the soil pipe by an Allen wrench.

Since the second portion 54 has a conical disposition, the seal 56 is forced into position between the soil pipe and the second portion 54 which provides a very effective positive seal having pressure or forces applied to each side thereof.

There is also included a seal 70 between the flange 32 of the closet ring and the water closet. This seal may be of a wax compound, putty or a soft rubber.

The invention has been described in an illustrative manner and it is to be understood that the terminology which has been used is intended to be in the nature of words of description rather than of limitation.

Obviously many modifications and variations of the present invention are possible in light of the above teachings.

The embodiments of the invention in which an exclusive property or privilege is claimed are defined as follows:

I claim:

1. A closet assembly comprising: a water closet having an exhaust flange; a soil pipe; a surface surrounding said soil pipe; a closet ring including a radial flange resting upon said surface about said soil pipe; a first annular portion extending from said radial flange and receiving said exhaust flange; and a second annular portion extending from said first portion and into said soil pipe; and seal means disposed about said second portion and engaging said soil pipe; said first annular portion having a larger diameter than said second annular portion; said second annular portion being spaced from said soil pipe; said closet ring including a radially extending section disposed between said first and second portions; said seal means including an annulus disposed between said second portion and said soil pipe and a radial lip having a length at least equal to the length of said radially extending section and disposed between said radially extending section and the end of said soil pipe; said second portion of said closet ring being conical over its entire length so as to have a decreasing diameter therealong in a direction away from said radially extending section.

2. An assembly as set forth in claim 1 wherein said annulus of said seal means includes at least one rib extending annularly thereabout.

3. An assembly comprising: a water closet having an exhaust flange; a soil pipe; a surface surrounding said soil pipe; a closet ring including a radial flange resting upon said surface about said soil pipe; a first annular portion extending from said radial flange and receiving said exhaust flange; and a second annular portion extending from said first portion and into said soil pipe; and seal means disposed about said second portion and engaging said soil pipe; said first annular portion having a larger diameter than said second annular portion; said second annular portion being spaced from said soil pipe; said closet ring including a radially extending section disposed between said first and second portions; said seal means including an annulus disposed between said second portion and said soil pipe and a radial lip disposed between said radially extending section and the end of said soil pipe; said annulus of said seal means including at least one rib extending annularly thereabout; said second portion of said closet ring being conical so as to have a decreasing diameter therealong in a direction away from said radially extending section; said second portion of said ring being longer than said annulus of said seal means whereby the respective ends of said second portion and said annulus are spaced along said soil pipe; and screw means threadedly engaging said second portion and extending therefrom to engage said soil pipe for retaining said closet ring in said soil pipe; said screw means being disposed between said ends of said annulus and said second portion.

4. An assembly as set forth in claim 3 wherein said radial flange of said closet ring includes means for attaching said water closet thereto and means for securing said closet ring to said surface about said soil pipe.

5. An assembly for interconnecting a water closet and a soil pipe, said assembly comprising; a closet ring including a radial flange with means for attaching the water closet thereto, a first annular portion extending from said radial flange for receiving the exhaust flange of the water closet, a second annular portion having a smaller diameter than said first annular portion and connected thereto by a radially extending section for insertion into the soil pipe; and a seal encircling said second annular portion for sealing disposition between said second portion of said ring and the soil pipe, said seal including an annulus disposed about said second portion for sealing within the soil pipe and a radial lip having a length at least equal to the length of said radially extending section for disposition between said radially extending section and the end of the soil pipe, said second portion being conical over its entire length so as to have a decreasing diameter therealong in a direction away from said radially extending section.

6. An assembly as set forth in claim 5 wherein said annulus of said seal has a pair of spaced ribs extending thereabout.

7. An assembly as set forth in claim 6 wherein said means for attaching the water closet to said radial flange includes a pair of diametrically opposed slots extending radially into said flange and circumferentially extending slots each having an enlarged portion, and a plurality of holes in said flange for securing said flange to a surface about the soil pipe.

8. An assembly as set forth in claim 7 including a seal between said radial flange and said water closet.

References Cited

UNITED STATES PATENTS

| | | | |
|---|---|---|---|
| 679,459 | 7/1901 | Johnson et al. | 285—60 |
| 800,664 | 10/1905 | McClintock | 285—56 |
| 2,116,705 | 5/1938 | Marx et al. | 285—374 X |
| 2,976,543 | 3/1961 | Turner et al. | 285—56 X |
| 3,012,252 | 12/1961 | Gaddy | 285—59 X |
| 3,037,212 | 6/1962 | Kleinhof | 285—58 X |
| 3,101,960 | 8/1963 | Danescu | 285—58 |
| 3,148,895 | 9/1964 | Jasper et al. | 285—8 X |

FOREIGN PATENTS 858,523  1/1961  Great Britain.

DAVID J. WILLIAMOWSKY, Primary Examiner

DAVE W. AROLA, Assistant Examiner

U.S. Cl. X.R.

285—374